Dec. 11, 1923.
W. H. FULTON
ENGINE EXHAUST MEANS
Filed April 13, 1921
1,476,704
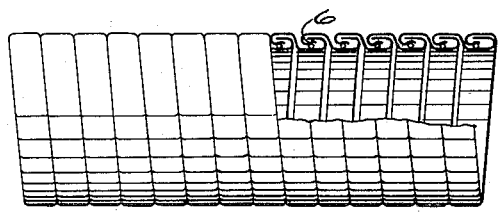
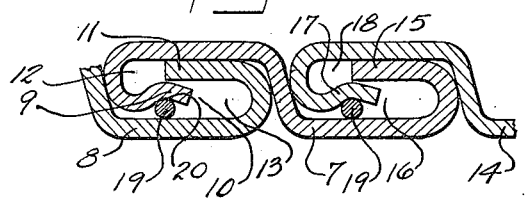
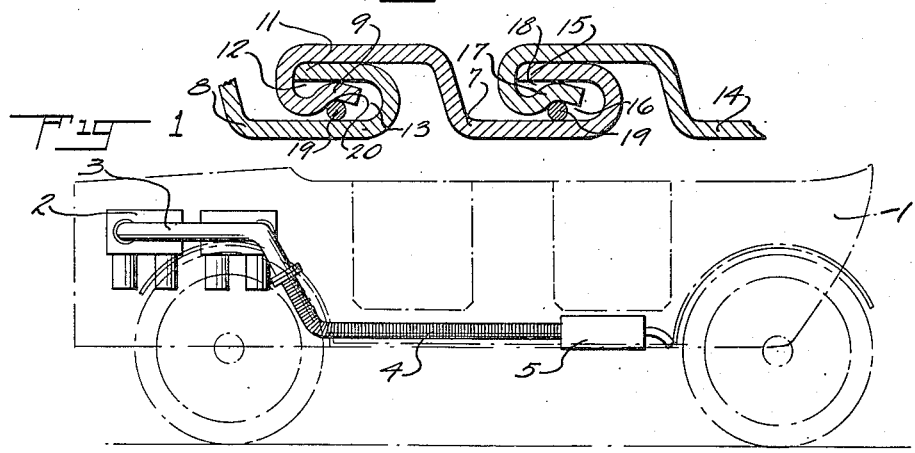
William H. Fulton, Inventor
By his Attorney
Thomas Howe Patented Dec. 11, 1923.

1,476,704

UNITED STATES PATENT OFFICE.

WILLIAM H. FULTON, OF IRVINGTON, NEW JERSEY, ASSIGNOR TO TITEFLEX METAL HOSE CORPORATION, A CORPORATION OF NEW YORK.

ENGINE EXHAUST MEANS.

Application filed April 13, 1921. Serial No. 461,061.

*To all whom it may concern:*

Be it known that I, WILLIAM H. FULTON, a citizen of the United States of America, residing at Irvington, county of Essex, and State of New Jersey, have invented new and useful Improvements in Engine Exhaust Means, of which the following is a specification.

This invention relates to conduits which are especially adapted for conveying highly heated fluids as for instance the exhaust gases of internal combustion engines.

It is very desirable that bendable tubes be employed for exhaust conduits so that elbows and other special fittings can be dispensed with and the bends formed to fit the conditions as the conduit is installed.

Tube formed from a helically coiled strip lends itself to commercial processes of manufacture and that form of tube which derives flexibility from sliding in its joints can be made of heavy strip so that it will withstand the heat of exhaust gases or the like. Such tubes are not fluid tight in the joints (unless packed) and although sufficiently tight for exhaust conduits in some cases, in other cases a substantially tight tube is desirable. Attempts have, therefore, been made to pack the tube. It will be seen, however, that the high temperature incident to the exhaust gases precludes the use of ordinary forms of packing and it has even been found that asbestos cord, selected for its heat refractory properties, disintegrates under the high temperatures. Also the softer metals, such as lead and its compounds, become fused and their usefulness as packing is destroyed. Hard metal wire will withstand the heat of the exhaust conduit but the teaching of the art of flexible tubes in relation to such tubes which are formed of strip and have sliding joints, is that a hard wire packing is not to be used because, as the tube is flexed back and forth, the hard wire cuts and wears the material of the tube so that it is soon rendered worthless. I have conceived, however, that the teachings of the flexible tube art may be disregarded in the case of exhaust conduits and that a hard wire packing capable of withstanding the high temperatures involved may be used, and at the same time the avoidance of elbows &c. which are made unnecessary by the flexibility of the tube, may be realized. The success of this tube structure as an exhaust conduit, I attribute to the fact that ordinarily flexible tubes are flexed with sufficient frequency so that the wear on the tube is not permissible, while in the case of exhaust conduits they are flexed so infrequently that this wear does not take place. In fact ordinarily the installation of the tube as an exhaust conduit would require flexing but once to conform to the desired location and then it is fixed in position by suitable securing means so no further flexure occurs. The tube bent but once as described, might perhaps be appropriately called a "bendable" tube as distinguished from a flexible tube, the latter being more apt to describe those tubes which are frequently flexed.

It may, therefore, be stated that the main object of the present invention is to provide a tube formed of a helically disposed strip having the edges of adjacent convolutions interfolded, the joints being packed by a metal wire between the interfolded parts in combination with an engine from which the tube receives the hot exhaust gases, the metal packing wire referred to being sufficiently heat refractory to resist the high temperatures to which the tube is subjected. Although it is anticipated that the invention will be found of greatest use in connection with the exhaust of internal combustion engines, it may be employed for conducting hot fluids derived from other sources and I consider that I am the first to conceive of a flexible tube which may be bent to avoid elbows, etc., which tube is formed of a helically disposed strip having the edges of convolutions interfolded and sliding in the joints to provide flexibility, the joint being packed with a hard metal wire and the tube so constructed being secured in position so that it is not frequently flexed whereby the tube, as described with the hard metal packing is made practicable, whereas it has been impracticable.

A further object of the invention is to provide an improved tube which is manufactured by a helically disposed strip of metal and interfolding the edges of adjacent convolutions with sufficient clearance in the joint so that the interfolded parts may slide and impart flexibility to the tube, such tube being provided with a packing consisting of a metal wire which is fed into the joint between adjacent interfolded parts, a shallow groove, less than the diameter of the wire, being provided along one edge of the strip to hold the wire in place so that the wire, bearing against the flat face of the adjacent convolution forces apart the parts of the joint between which it is placed and makes its own bed by bending up the grooved edges of the strip so that in the completed tube the resiliency of the tube strip causes the parts to spring against and firmly grip the metal packing so that the tightness of the joint is greatly enhanced.

A further object of the invention is to provide an improved method whereby the above tube may be manufactured.

Other and ancillary objects of the invention will appear hereinafter.

In the accompanying drawings which illustrate the invention—

Fig. 1 is a side elevation of a portion of an automobile showing an internal combustion engine, and an exhaust conduit embodying the invention;

Fig. 2 is a side elevation of the tube forming the exhaust conduit in Fig. 1, partly in section;

Fig. 3 is an enlarged section of a fragment showing the tube joint parts in one extreme of their movement; and Fig. 4 is a view similar to Fig. 3 but showing the joint parts at the other extreme of their movement.

Referring to the drawings, the apparatus comprises an automobile 1 having the propelling motor 2, the same being an internal combustion engine having an exhaust manifold 3, to which is secured the conduit 4 which is secured in position by reason of being secured to the exhaust manifold at one end, as shown, and at the other end being secured to the muffler 5. It will be seen that the necessary bends having been made the conduit 4 is secured in position so that no flexing of the tube forming the conduit is required except that incident to its original installation.

The tube is formed by helically disposing a strip and interfolding the edges of adjacent convolutions to form joints 6. These joints are provided with sufficient clearance so that the interfolded parts of two adjacent convolutions may slide with relation to each other longitudinally of the tube, so that bending of the tube is permitted. Thus, referring particularly to Figs. 3 and 4, a convolution 7 has one side pass outside of an adjacent convolution 8 and then has its edge 9 bent inwardly so as to pass within the channel 10 formed by the bending back upon itself of the edge 11 of the convolution 8. Between the convolution parts within the joint are the clearances 12 and 13 which permit the interfolded parts in the joint to slide with relation to each other longitudinally of the tube as before referred to. The other side of the convolution 7 passes within the adjacent edge of the convolution 14 upon its other side and has its edge 15 bent over to form the channel 16 within which extends the bent over edge 17 of the convolution 14, there being clearances in the channel 16 and in the channel 18 in the convolution 14 so that the parts of the joint interfolded as described, may move with relation to each other to give flexibility to the tube.

The material of the strip of which the tube is formed is ordinarily of iron, this being strong, readily worked and capable of withstanding the high temperatures of the exhaust gases, and in order to pack the tube against leakage a wire 19, is disposed in helical forms so as to lie between layers in the helical joint formed by interfolding the contiguous edges of adjacent convolutions of the strip of which the tube is formed. This wire may also be advantageously of iron as this material is well adapted to withstand the heat involved in an exhaust conduit and owing to the peculiar circumstances attending the use of the tube as an exhaust conduit as hereinbefore referred to, this hard metal may be safely used.

The tube may be formed in any well known manner from a strip bent so as to have the edges of adjacent convolutions interfolded, for instance in the manner as set forth in my application jointly with Louis H. Brinkman and Herman Shellmer, Serial Number 153,263 filed March 8, 1917. In such formation, however, the interfolded edges of the tube are flat so that the layers of the joint lie upon each other. In the present case, the wire 19 is fed in between the layers of the joint, a slight groove or channel 20 having been formed along one edge of the strip to properly guide and hold the wire the groove being less than the diameter of the wire. It will be seen that the spring of the material will cause the wire to be tightly gripped between the layers so as to form a tight joint and the free side of the edge 9 of one of the layers will be bent further away from its adjacent flat layer 8 against which the wire bears, than is the first mentioned layer upon the other side of the wire. This is clearly shown in Figs. 3 and 4 wherein it will appear that the free edge of a layer is bent upwardly to a greater degree and is, therefore, further away from the adjacent layer against which the wire bears than is the bent layer at the other side of the wire.

In Fig. 3 the tube joint is shown in the condition where the convolutions are pushed together as much as possible, while in Fig. 4 they are shown drawn apart as much as possible.

While the invention has been illustrated in what is considered its best application, it may have other embodiments without departing from its spirit and is not, therefore, limited to the structure shown in the drawing.

What I claim is:

1. The combination with an engine having an exhaust port, of a bendable conduit receiving the gases from said port, said conduit having a helically disposed strip with the edges of adjacent convolutions interfolded, there being clearances between the interfolded parts permitting relative sliding thereof and the bending of the tube, and a helically disposed metal wire capable of withstanding the temperature of the exhaust gases interposed between the interfolded parts to form a packing in the sliding joint between adjacent convolutions.

2. The combination with a conduit having a helically disposed strip with the edges of adjacent convolutions interfolded, there being clearances between the interfolded parts permitting relative sliding thereof and bending of the tube and a helically disposed strip of metal wire interposed between interfolded parts to form a packing in the sliding joint between adjacent convolutions and means for securing said conduit in a given position.

3. The combination with a source of fluid of temperature much greater than the atmosphere, of a flexible conduit communicating with said source, said conduit having a helically disposed strip with the edges of adjacent convolutions interfolded, there being clearances between the interfolded parts permitting relative sliding thereof and bending of the tube, and a helically disposed metal wire capable of withstanding the temperature of the said fluid interposed between the interfolded parts to form a packing in the sliding joint between adjacent convolutions.

4. The combination with an engine having an exhaust port, of a bendable conduit receiving the gases from said port, said conduit having a helically disposed strip with the edges of adjacent convolutions interfolded, there being clearances between the interfolded parts permitting relative sliding thereof and the bending of the tube, and a helically disposed metal wire capable of withstanding the temperature of the exhaust gases interposed between the interfolded parts to form a packing in the sliding joint between adjacent convolutions, and means for securing said tube in a given position.

5. A bendable tube having a helically disposed strip with the edges of adjacent convolutions interfolded whereby a joint is formed having a plurality of superposed layers, there being clearances between the interfolded parts permitting relative sliding thereof and bending of the tube and a metal wire interposed between two of said layers, the said two layers being separated to a greater distance on one side of the wire than on the other.

6. A bendable tube having a helically disposed strip with the edges of adjacent convolutions interfolded whereby a joint is formed having a plurality of superposed layers, there being clearances between the interfolded parts permitting relative sliding thereof and bending of the tube and a metal wire interposed between two of said layers, one of said layers having the free edge of a convolution bent away from the other of said two layers to a greater distance than that portion of the layer on the other side of said wire.

7. A bendable tube having a helically disposed strip with the edges of adjacent convolutions interfolded whereby a joint is formed having a plurality of superposed layers, there being clearances between the interfolded parts permitting relative sliding thereof and bending of the tube and a metal wire interposed between two of said layers, one of said layers having the free edge of a convolution bent away from the other of said two layers to a greater distance than that portion of the layer on the other side of said wire, and conforming to the contour of the wire to prevent slipping of the wire from under said layer.

8. The method of forming a flexible tube which consists in helically disposing a strip and interfolding edges of adjacent convolutions with clearances between the interfolded parts to form a joint having relatively sliding radially displaced layers, one of said edges being flat and the other shallowly grooved, and feeding a metal wire between two of the said layers whereby one of the layers is bent to provide space for the wire and the wire is gripped between the two layers.

9. The method of forming a flexible tube which consists in helically disposing a strip and interfolding edges of adjacent convolutions with clearances between the interfolded parts to form a joint having relatively sliding radially displaced layers, and bending the free edge of one of the layers of the joint away from a layer adjacent to it by inserting a packing wire between the two said layers.

In testimony whereof I have signed this specification this 5th day of April, 1921.

WILLIAM H. FULTON.